United States Patent [19]

Peterson, Jr. et al.

[11] Patent Number: 4,844,846
[45] Date of Patent: Jul. 4, 1989

[54] METHOD AND APPARATUS FOR CONTROLLING THE WEIGHT PER UNIT LENGTH OF A CONTINUOUS EXTRUDATE

[75] Inventors: John E. Peterson, Jr., Cuyahoga Falls; Anthony M. Apicella, Massillon, both of Ohio

[73] Assignee: The Uniroyal Goodrich Tire Company, Akron, Ohio

[21] Appl. No.: 144,211

[22] Filed: Jan. 15, 1988

[51] Int. Cl.$^4$ ............................................. B29C 47/92
[52] U.S. Cl. .................................. 264/40.4; 264/40.7; 425/140; 425/145
[58] Field of Search ................... 264/40.4, 40.1, 40.7, 264/40.2; 425/140, 135, 142, 145

[56] References Cited

U.S. PATENT DOCUMENTS

| | | | |
|---|---|---|---|
| 2,289,933 | 7/1942 | Rankin | 425/140 |
| 2,726,922 | 12/1955 | Merrill et al. | 425/140 |
| 3,150,213 | 9/1964 | Doering | 425/140 |
| 3,286,302 | 11/1966 | Doering | 425/145 |
| 4,087,499 | 5/1978 | Bayonnet | 264/40.4 |
| 4,088,721 | 5/1978 | Apicella, Jr. | 264/151 |
| 4,097,566 | 6/1978 | Bertin et al. | 425/142 |
| 4,156,913 | 5/1979 | Apicella, Jr. | 264/40.4 |
| 4,233,255 | 11/1980 | Moon | 264/40.4 |
| 4,428,896 | 1/1984 | Stevenson | 264/40.4 |

Primary Examiner—Jeffery Thurlow
Attorney, Agent, or Firm—Alfred D. Lobo; Alan A. Csontos

[57] ABSTRACT

Stringent specifications for an extrudate are maintained by accurate control of tread weight per unit length without regard for dimensional changes of the extrudate. This is achieved simply by adjusting the speed of a single variable-speed conveyor, whether the running-weigh-scale ("RWS") conveyor, or, the take-away conveyor, without adjusting the extruder screw, or operation of the extruder, and without measuring any dimension (width or gauge) of the extrudate; therefore, with no regard either to the cross-sectional area, or surface area, or volume of the tread. The accuracy of control depends chiefly on how accurately one can measure the weight/unit length, and how precisely the speed of the single variable-speed conveyor can be controlled. Exceptional on-spec control in the continuous extrusion of a tread stock is achieved because it was recognized that dimensional changes of the tread stock, independent of its change in weight/unit length, do not adversely effect the specifications of the extruded tread. This process and the particular configuration of the equipment in the tread line is particularly adapted to make the necessary comparison of RWS and target values which results in the production of extrudates with a weight tolerance of less than ±5%, and preferably less than ±2%.

11 Claims, 3 Drawing Sheets

METHOD AND APPARATUS FOR CONTROLLING THE WEIGHT PER UNIT LENGTH OF A CONTINUOUS EXTRUDATE

BACKGROUND OF THE INVENTION

This invention relates generally to a control system for accurately, and continuously controlling the weight per unit length (weight/unit length) of an uncut extrudate of arbitrary length and cross-section for which the dimensions are left uncontrolled.

More specifically this invention relates to a process and apparatus for automatically maintaining the desired weight/unit length of a continuously extruded rubber tread produced from one or more extruders, without measuring or directly controlling the area of the tread, or its transverse cross-sectional area. Plural extruders are used in tandem to produce a joined extrudate, or, to produce extrudates which are combined in a common head. This invention may equally be applied to other extrudates of elastomeric stock if one recognizes that the specific weight can be maintained though the dimensions of the extrudate may vary with changes of density.

Heretofore, the elastomeric stock used for tire treads has been extruded in a continuous strip of desired width and thickness, cooled, and cut to a required length dictated by the circumference of a green tire carcass to which it is to be applied. Variations within a production run are caused due to (i) changing rubber properties and (ii) operating conditions in the overall system, particularly variations in the operation of the extruder. In the past, the thickness of tread stock has therefore been controlled by monitoring the dimensions of the extruded tread, and also its weight, and making the necessary adjustments, whether manually or automatically, in response to the changes measured.

We have successfully been able to control the extruded tread within the strictest specifications by measuring only weight/unit length, and ignoring dimensional changes which may occur independent of weight changes. Because of its geometry, tread weight is directly related both to its thickness, and to its area. Changes in dimensions without a corresponding change in weight occur due to variation in density resulting from changes in the amount of entrained air. Therefore a dimensional change may not indicate a change in mass. By controlling only weight/unit length, we have indirectly taken advantage of this principle to simplify the task of producing "on-spec" tread stock.

Monitoring of an extrudate in the prior art is accomplished by comparing the weight/unit area of a running length of continuous extrudate as it passes over a running-weigh-scale (hereinafter referred to as he "RWS") to that of a cut length of the material taken at a check-weigh scale ("CWS") after the extrudate is cooled and skived (cut to length). This requires measuring both length and width to determine the area. Since the length is typically kept constant, based on a running unit length of extrudate over a scale, it is evident that the dimension to be monitored is width.

In the specific instance of producing tread stock, the series of equipment required to produce it, namely the extruder, takeaway conveyor, shrink rolls, auxiliary conveyors, cooling train, and skiver, along with various monitoring equipment, is referred to as the "tread line". The tread stock specification, in the prior art, is established at the CWS with the RWS providing a means for making a first approximation inasmuch as the RWS and CWS are generally at separate locations in the tread line. Once the relationship between RWS and CWS is established, the desired value of CWS can be translated into a desired value of RWS. We establish a target weight/unit length based on an ideal tread without regard for the value obtained at the CWS. By "ideal tread" we refer to a predetermined weight of tread for a particular tire. This target weight at the RWS is referred to simply as "target weight" for brevity. In our process, the weight at the CWS is checked only to determine whether the tread is on-spec.

In U.S. Pat. No. 4,233,255 to Moon, there is disclosed a two-conveyor system for controlling the weight per unit area (weight/area) of a continuous extrudate after it leaves the second conveyor. His correct, geometrically accurate analysis utilizes the principle that weight/unit area is the key to providing the correct gauge (thickness). It is implicit that he must measure both length and width to know the area, and the width is measured manually either in line, or, after the tread is cut to length. He provides no disclosure as to how he measures width automatically, either before or after the tread is cut to length.

Therefore the '255 method comprises controlling either the thickness or the weight/unit area of continuously extruded extrudate. He failed, as did others in the prior art, to recognize that one can ignore variations in both width and thickness, if the weight/unit length is controlled closely enough. Thus, in the '255 tread line, Moon uses a first variable speed take-away conveyor belt to convey the extrudate as it exits the extruder, a second variable speed conveyor belt for varying the thickness or weight of the extrudate after leaving the first conveyor belt, a RWS to measure the weight/unit area of the extrudate after it leaves the second conveyor, and a target value. His method comprises measuring the weight value of the extrudate at the RWS; comparing the RWS measured value to the target value to obtain a control signal; and adjusting the difference in speed between the first conveyor belt and the second conveyor belt in response to the control signal. This method relies on adjusting the relative speed of the extrudate as it travels between, and over, two variable-speed conveyors.

The Moon patent requires that there be an adjustable difference in the speed between the two variable-speed conveyors to control weight which he states gives the desired control, without the "thinning" or "thickening" effect obtained by controlling the extrudate with a single variable speed conveyor, as described in U.S. Pat. No. 4,088,721 to Apicella, Jr. We revert to the use of a single variable-speed conveyor and have discovered that despite the thinning and thickening effect that we experience, it does not interfere with precise control of the tread specifications. Moon sought to avoid this effect by controlling weight/unit area, thus maintaining constant thickness. Neither Moon nor Apicella appreciated how unexpectedly simple and effective the spec-control process would be if they relied solely on controlling the weight/unit length of the tread.

Referring again to the method for the control of extruded stock in the '721 patent to Apicella, Jr., note that he controls the thickness of the stock. In that patent, the RWS is continuously compared with the CWS to obtain a targeted average. The measured RWS is compared to the targeted average to obtain a control signal. The control signal is used to increase or decrease the speed of a take-away conveyor belt, positioned at the exit orifice of the extruder. If, for example, the measured RWS is too high compared to the targeted RWS, the speed of the take-away conveyor belt is increased to stretch the extrudate. This will result in a thinner tread stock. Alternatively, if the RWS value is too low, resulting in a low value of CWS, indicative of a thinner tread stock, the take-away belt may be slowed down with the result being a thicker extrusion.

In the '255 method, the takeaway conveyor at the extruder and the RWS conveyor are the two conveyors which have relatively variable speeds, providing a speed differential which dictates the weight/area, and the thickness of the extrudate. Between these two conveyors are a series of rollers to allow the tread to cool and shrink. It is only after the extrudate leaves the second conveyor that its weight is checked at the RWS. This is done deliberately to accomodate tread shrinkage, so that the second conveyor controls both the thickness and the weight. The actual degree of tread shrinkage between these two conveyors is dependent on the temperature, compound rheological properties, tension at the die opening, and speed differential between the two conveyors. These transient conditions make it difficult, accurately to adjust tread weight by adjusting the difference in speeds between the two conveyors in this region of the tread line, particularly because the transient conditions may vary quite often within a given period (say, a shift), and often from one hour to the next. Therefore, in our invention, as in the prior art, we use a shrink roll conveyor to allow for shrinkage, but because we seek to control mass, not dimension, in the instance where the shrink rolls precede our RWS (as shown in FIG. 1), we accept whatever shrinkage the shrink rolls provide.

The control of size deviation either by manipulating the output rate of an extruder, or, by manipulating the speed of a takeaway means, has been well known in the art. In cold-feed extruders, it is known to manipulate the speed of the screw to vary the extruder output and thus control size deviations. Likewise, in hot-feed extruders, it is known to manipulate the feed rate by varying the width of the strips of rubber fed into the extruder from the breakdown mill. In addition to the Moon, and Apicella patents referred to hereinabove, examples of processes in which the take-away speed is manipulated to control size deviations are also found in U.S. Pat. No. 4,087,499, issued to Bayonnet; and in U.S. Pat. No. 4,097,566 to Bertin et al. Another example of process control in which a double roller die is used to control size is shown in U.S. Pat. No. 3,975,126, issued to Wireman et al.

Our system adjusts the takeaway conveyor to maintain a constant weight/unit length as soon as the extrudate leaves the die opening in the extruduer, or as soon thereafter as is practicable if an existing tread line (referring to all the equipment currently used in the processing of tread extrudate) is to be used. This control of weight in close proximity, if not adjacent, to the die opening has the incidental effect of changing the tension on the extrudate at the die opening, which also helps produce the precise required weight at the RWS. Only the speed of a single variable-speed conveyor is used for control, and the speed of all other conveyors is adjusted with loop controls to minimize subsequent tension on the extrudate. Of course, the extrudate being extruded from the die opening is affected by some of the same parameters mentioned previously, i.e. compound temperature and rheological properties, but our system reacts and adjusts for such changes by controlling extrudate weight/unit length. Width and cross-sectional area changes are ignored because these may be affected by density changes within limits are tolerable.

This control system is easily distinguishable over one using plural variable-speed conveyors and where a second conveyor is required to maintain a target weight by stretching or shrinking the extrudate. The prior art method is less effective particularly when the second conveyor is in a portion of the tread line, after the shrink rolls, because it is known that the dimensions of the tread can be more variable after shrinkage than they are next to the extruder's die opening. Therefore in our most preferred embodiment, the RWS and takeaway conveyor are positioned adjacent the extruder.

In our system, it is also possible to modify an existing tread line where the RWS is positioned after the shrinkage conveyor, by equipping the tread line with the control means specified herein. Because of the relative distance between the RWS and the extruder in such a system, one obtains long-term control at the expense of short-term control of precise tread specifications. Stated differently, the more quickly one controls weight/unit length as it leaves the extruder, either with a take-away conveyor associated with the RWS, or with a RWS positioned following the takeaway conveyor, the better the control, and the more rapid the detection of a change in weight near the die opening.

SUMMARY OF THE INVENTION

It has been discovered that accurate control of tread weight per unit length may be achieved simply by adjusting the speed of a single variable-speed conveyor, whether the running-weigh-scale ("RWS") conveyor, or, the take-away conveyor, without adjusting the extruder screw, or operation of the extruder, and without measuring any dimension (width or gauge) of the extrudate; therefore, with no regard either to the cross-sectional area, or surface area, or volume of the tread. In our process, the accuracy of control depends chiefly on how accurately one can measure the weight/unit length, and how precisely the speed of the single variable-speed conveyor can be controlled. We have been able to accomplish exceptional onspec control in the continuous extrusion of any extrudate where dimensional changes of the extrudate, independent of its change in weight/unit length, do not adversely effect the specifications of the extruded product. This process is particularly adapted for production of extrudates where the weight tolerance is less than $\pm 5\%$, and preferably less than $\pm 2\%$.

In this general process, comprising extruding a continuous strip of an elastomeric extrudate, passing it over plural conveyor means, weighing it on a RWS weigh means, and shrinking the extrudate, without regard to the sequence of the foregoing steps, the improvement comprises:

(a) measuring the weight per unit length of said extrudate at the RWS to generate a measured value, (b) comparing a target weight to said measured value to obtain a control signal, and (c) adjusting the speed of a single variable-speed conveyor means among said plural conveyor means in response to said control signal, whereby the weight per unit length of said extrudate is controlled within desired specified limits of weight without regard for any change in dimension (width or gauge) of said tread, without varying the operation of the extruder, and without varying the speed of any other than the variable-speed conveyor.

BRIEF DESCRIPTION OF THE DRAWINGS

The foregoing and other objects and advantages of our invention will appear more fully from the following description, made in connection with the accompanying drawings of preferred embodiments of the invention, wherein.

DETAILED DESCRIPTION OF THE PREFERRED EMBODIMENTS

Figure 1:
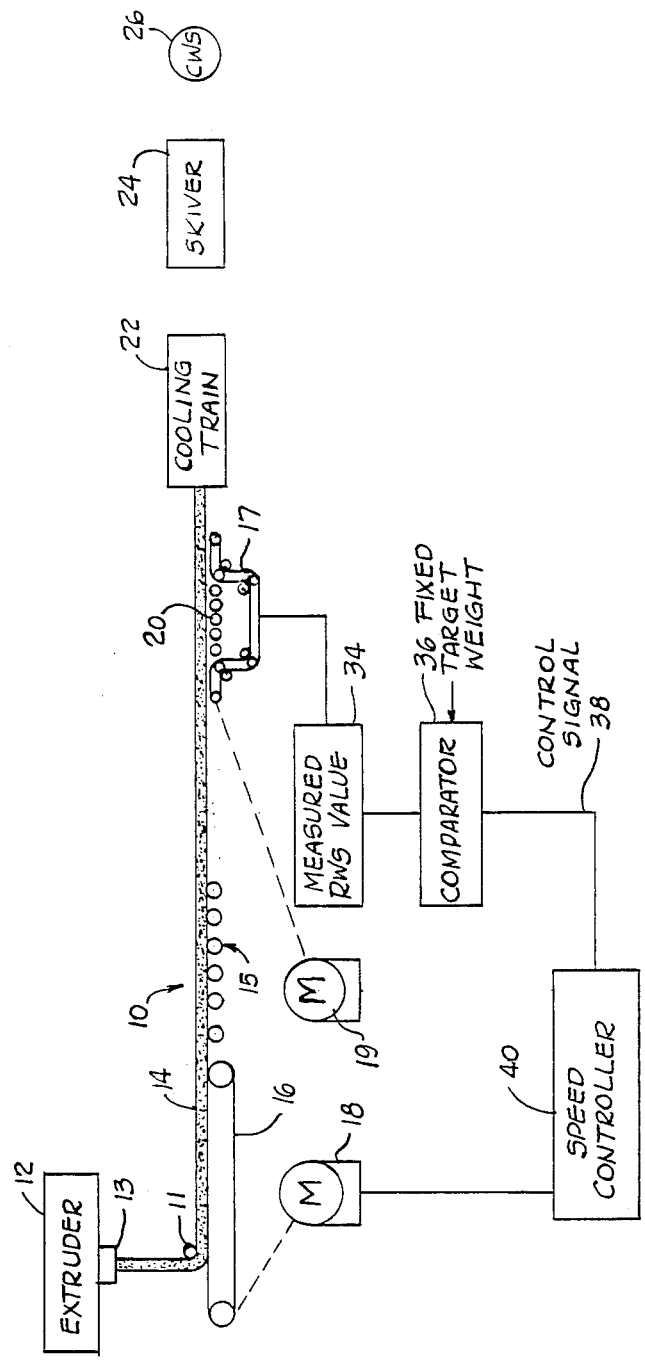
FIG. 1 schematically illustrates a conventional tread line modified so that a takeaway conveyor is the first and only variable speed conveyor, of plural conveyor means carrying away a tread from an extruder. The tread then successively passes over shrink rolls over which the tread passes at a preset speed, then, over a RWS having a constant speed RWS conveyor belt, from which the tread is carried to another conveyor in a cooling train thereafter to a skiver.

In a first embodiment, this invention may be adapted to a conventional tread line which is modified to include a variable-speed takeaway conveyor which accepts the extrudate in close proximity to the extruder. From the takeaway conveyor, the extrudate passes over shrink rolls, and then to an RWS. The RWS comprises plural weight-sensitive rollers disposed intermediate the ends of a generally U-shaped endless conveyor belt (referred to as the RWS belt). In this embodiment, the speed of the RWS belt, and that of any auxiliary conveyor(s) which may be part of the cooling train, are fixed separately to minimize subsequent tension on the extrudate. Because of the known shrinkage which occurs in the shrink rolls which is matched in the speed of the RWS belt, both operate at a slightly slower speed than the takeaway conveyor, typically from about 10 to 15% slower, and of course, the speed of the shrink rolls and RWS belt will be adjusted if the shrinkage changes.

In this first embodiment, only the speed of the variable-speed takeaway conveyor is controlled by a control signal generated by a comparator. The comparator compares the measured weight, measured at the RWS, with a predetermined "ideal" or target weight.

Since, in this first embodiment, the RWS is relatively distantly spaced from the die opening in the extruder, accuracy of weight-control suffers due to the lag time corresponding to the distance between the takeaway conveyor and the RWS. Thus, though in this first embodiment, we obtain accurate weight per unit length after shrinkage, we tolerate fast-occurring differences for which no adjustments are made, the reliance being solely upon compensation for tread weight over longer periods. Normal shrinkage occurs after the indicated adjustment of belt speed of the variable-speed takeaway conveyor is made, and no attempt is made to adjust the belt speed to compensate for such dimensional changes as may result from this shrinkage, since it is included in the predetermined relationship between the RWS and the CWS.

Accordingly, in this first embodiment, a tread line is provided for controlling only the weight/unit length of elastomer material continuously extruded from an extrusion system, wherein the system has an extruder; a first variable speed takeaway conveyor belt to convey the extrudate as it exits the extruder; a decreasing surface speed shrink roll means having a predetermined linear velocity 12% less than that of the takeaway conveyor, so that the difference in speeds between the variable speed shrink roll means and the takeaway conveyor is not adjustable, and only the takeaway conveyor controls the weight of the tread; and, a RWS to measure the weight/unit length of the continuous extrudate without regard to any piece of equipment following in the tread line after the RWS.

The method in this first embodiment comprises, measuring the weight of the extrudate at the RWS; comparing the measured value to a target weight to obtain a control signal; and, adjusting speed of only the variable-speed takeaway conveyor in response to the control signal, without regard for the difference in speed between the first conveyor belt and the shrink roll means, or RWS conveyor belt, or, any other auxiliary conveyor belt.

Referring now to FIG. 1, there is shown a tread line, generally indicated by reference numeral 10, for extruding a hot tread 14 of conventional cross-section. The tread line 10 conventionally comprises an extruder 12 for producing the tread which is trained around a roller 11, then carried away by variable speed takeaway conveyor 16 driven by a first motor 18. The linear speed of the takeaway conveyor is controlled by motor 18. The takeaway conveyor 16 is positioned adjacent the extruder, typically less than five feet from a die 13 through which the tread is extruded. The tread is thereafter transported over shrink rolls 15 which permit the hot tread to shrink to a predetermined extent and thereafter to a RWS 20 and associated U-shaped, endless RWS conveyor belt 17 driven by a second motor 19 which maintains the speed of the RWS belt 17 constant to match the speed of the tread coming off the shrink rolls. The RWS provides a measured RWS value 34, measured over a scale comprising a multiplicity of rollers spaced over a precise length. A commercially available unit for such use is the Toledo RWS scale conventionally used for this purpose. It is this measured value which is transmitted to a comparator means 36.

Because the speed of the RWS belt has a fixed predetermined relationship to the speed of the takeaway conveyor, this relationship being determined by the shrinkage of the tread being extruded, the speed of the RWS belt is most preferably 12% less than that of the takeaway conveyor. From the RWS belt 17 the tread 14 is carried by a conveyor in cooling train 22 which 'sets' the dimensions of the tread so that it may be skived (cut) to predetermined tread lengths in a skiver 24. These skived lengths correspond to the precise length required for the circumference of a particular green tire carcass on which it is to be placed before the tire is cured.

Upon leaving the skiver, the cut tread sections are typically weighed at a check-weigh-scale (CWS) 26 to make certain that all treads are within a weight specification without regard to the thickness, or cross-sectional area of the extrusion. The comparator means 36 is provided with a target weight which is the ideal tread weight/unit length for the particular tread being extruded. This target value is fixed for that particular tread and is not varied from run to run. The weights from the CWS 26 are simply to check the performance of the automated system. The operator makes no adjustments based on the values he reads at the CWS, except to shut the line down if the CWS registers out of spec weight values.

During a typical run, the tread goes around roller 11 and is deposited on takeaway conveyor 16, and over shrink rolls 15 to RWS 20 where the weight is measured in and the RWS value compared in comparator 36 to the fixed target weight for that particular tread. The control signal 38 is relayed to speed controller 40 which controls the speed of the motor 18 which in turn controls the speed of the takeaway conveyor 16. As described before, the takeaway conveyor 16 is responsive to the control signal generated due to the difference in tread weight/length passing over the RWS belt 17, and, the target weight. Thus it is seen as long as the speed of the takeaway conveyor is adjusted by speed controller 40 to provide an on-spec weight at the RWS there is no further adjustments required. The cooling train 22 cools the tread stock leaving the RWS and the skiver 24 cuts the tread stock to predetermined lengths.

In a second more preferred embodiment, we have minimized the effect of fast-occurring changes by placing the RWS very close to the extruder's die opening, and providing the RWS with a variable-speed belt which functions as a takeaway conveyor. As a result, we obtain a weight immediately after the extrudate leaves the die opening, and, in response to a control signal generated by a comparator, a near-instantaneous adjustment of speed.

In this more preferred embodiment, we provide a tread line in which, as in the first embodiment, only the weight of the extrudate is continuously controlled by a single variable-speed conveyor belt. The tread line comprises, an extruder means; a RWS having an adjustable speed belt (referred to as a "variable-speed" RWS) disposed adjacent to the extruder means; constant speed shrink roll means having a predetermined linear velocity, so that only the belt speed of the RWS conveyor controls the weight of the tread; a constant speed auxiliary conveyor; and, optionally, additional conveyor means to transport the tread through a cooling train, each of the foregoing necessary pieces of equipment being arranged seriatim. The cooled tread is then skived into predetermined lengths.

The method in this more preferred embodiment comprises, measuring the weight/unit length of the extrudate at the variable-speed RWS immediately after the extrudate leaves the die opening; comparing the measured RWS value to the target weight to obtain a control signal; and, adjusting the speed of the variable-speed RWS in response to a control signal generated by a comparator so as to obtain an extrudate with a weight/unit length which closely matches the target weight.

Figure 2:
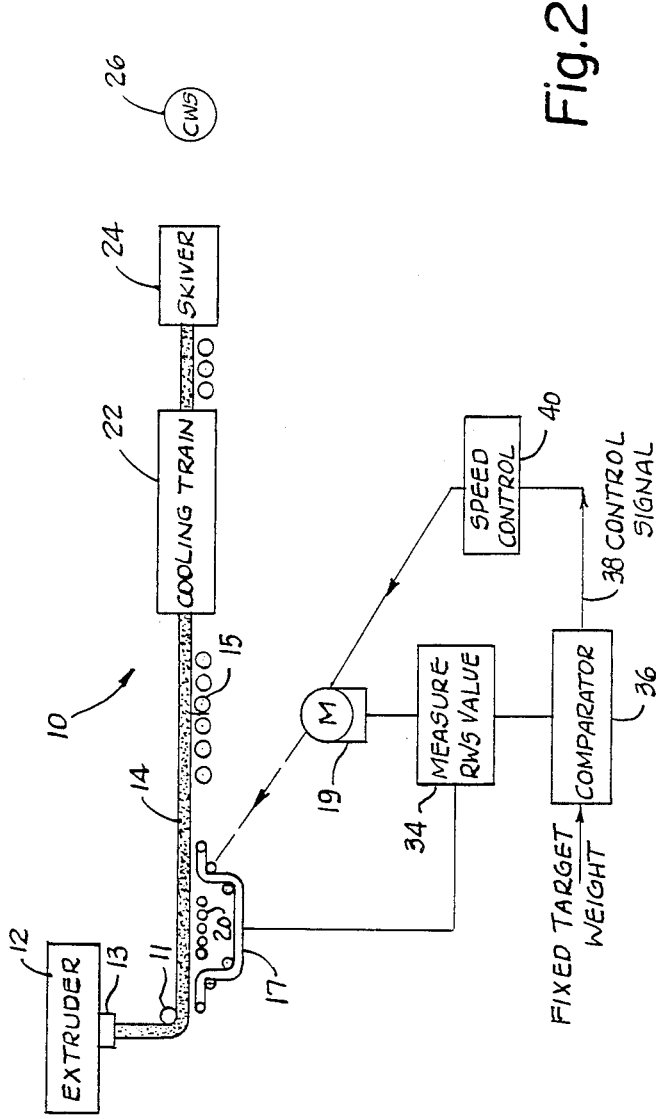
FIG. 2 schematically illustrates another conventional tread line in a tire manufacturing facility which has been modified to use a RWS having a variable speed belt which serves the dual function of (i) RWS conveyor and (ii) takeaway conveyor. The RWS is also the first of plural conveyor means carrying away a tread from an extruder. The tread then successively passes over shrink rolls, a first conveyor which carries the tread to another, second conveyor in a cooling train, and thereafter to a skiver.
Figure 3:
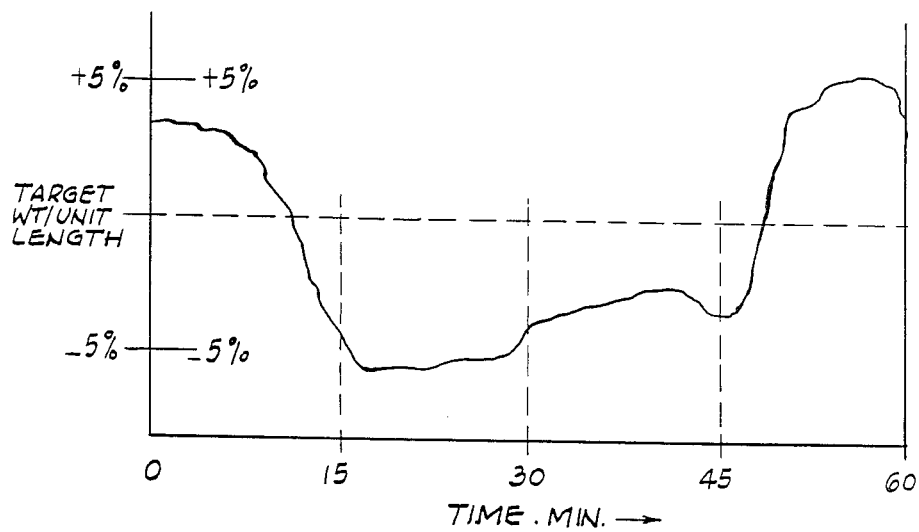
FIG. 3 is a graph indicating the variation in weight/unit length which results in the control of tread specifications by manually adjusting the weight and dimensions of an extruded tread by adjusting the speed of a single variable-speed conveyor.
Figure 4:
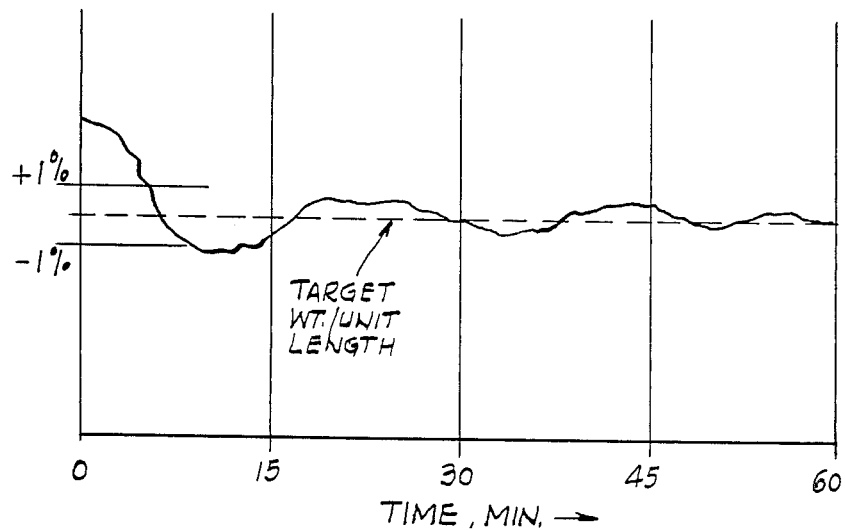
FIG. 4 is a graph indicating the variation in weight per unit length which results in the control of tread specifications in the same tread line, extruding the same tread, soon after the first test run for which the results are provided in FIG. 3, but using the process of this invention.

Referring to FIG. 2, there is shown a tread line, generally indicated by reference numeral 10, for extruding hot tread stock 14 in a tread line much the same as the one used in FIG. 1 hereinabove, except that the RWS, and RWS belt performing the function of the takeaway conveyor, are now placed very close to the extruder; and, it is this RWS belt speed which is the only variable-speed belt in the tread line. The previously used takeaway conveyor (in FIG. 1) is now simply used as an auxiliary constant speed conveyor.

The tread line 10 conventionally comprises an extruder 12 for producing the tread 14 which is trained around roller 11, then carried away by a running-weigh-scale (RWS) 20 having a belt 17 driven by a first motor 19. The speed of the belt 17 is variable, the speed being controlled by motor 19. The RWS is positioned adjacent the extruder, typically less than five feet from a die 13 through which the tread is extruded. The tread is thereafter transported over shrink rolls 15 to cooling train conveyor 22, to set the dimensions of the tread so that it may be skived to predetermined tread lengths in a skiver 24, and as before, these lengths correspond to the precise length required for the circumference of a particular green tire carcass on which it is to be placed before the tire is cured. Upon leaving the skiver, the cut tread sections are typically weighed at the CWS 26 to make certain that all treads are within a weight specification since the weight is directly related to the thickness of the extrusion.

A controller means 40 is provided with a target RWS value which is the ideal tread weight per linear foot for the particular tread being extruded. This target RWS weight is fixed for that particular tread and is not varied from run to run, for that particular tread cross-section. The values from the CWS 26 are simply to check the performance of the automated system. The operator makes no adjustments based on the values he reads at the CWS, except to shut the line down if the CWS registers out of spec weight values.

As the tread passes over the RWS, its weight is measured in the weigh means (this weight is referred to as measured RWS value 34) and is entered into the comparator 36. The comparator compares the measured (RWS) value to the target weight; if there is a difference, a control signal 38 is generated which is entered into the speed controller 40. Based upon the control signal 38, the speed controller 40 adjusts the speed of the motor 19 and the RWS belt 17. If the measured RWS is high, compared to the target value then the comparator 36 sends a control signal 38 to speed controller 40 to speed up the motor 19 and therefore the RWS belt 17. The effect is to stretch the tread and lower its weight per linear length. Conversely, if the measured RWS is low compared to the target value then the motor 19 is slowed down so that the speed of the RWS belt is decreased, thus having the effect of increasing its weight per unit length. Thus it is seen as long as the weight per unit length is controlled at the RWS there is no further adjustments affecting the specifications of the tread.

Having thus provided a general discussion, described the method of obtaining the specified extrudate by controlling only the weight/unit length, and provided a specific illustration of how effectively this is done, it is to be understood that no undue restrictions are to be imposed by reason thereof except as provided by the following claims.

We claim:

1. In a process for extruding a continuous strip of an elastomeric extrudate produced by one or more extruders, passing it over plural conveyor means in a train of equipment, weighing said extrudate on a running-weigh-scale means, and shrinking the extrudate, without regard to the sequence of the foregoing steps, the improvement comprising:
   (a) measuring only the weight per unit length of said extrudate at the running-weigh-scale to generate a measured value,
   (b) comparing said measured value to a target weight to obtain a control signal, and
   (c) adjusting the speed of only a single variable-speed conveyor means among said plural conveyor means in response to said control signal, whereby the weight per unit length of said extrudate is controlled within ±5 percent limits of weight without regard for any change in dimension of said extrudate, and without varying the operation of said extruder, or, the speed of any conveyor other than said variable-speed conveyor.

2. The process of claim 1 wherein said extrudate is of tread stock, and said train of equipment is a tread line.

3. The process of claim 1 wherein said running-weigh scale means and said variable-speed conveyor are each positioned adjacent said extruder.

4. The process of claim 1 wherein said running-weigh-scale means and said variable speed conveyor are each positioned distally relative to said extruder, after decreasing surface speed shrink roll means in said tread line.

5. In a process for extruding a continuous strip of tread stock from at least one extruder, passing the tread stock over a running-weigh-scale to measure its weight, said running-weigh-scale being associated with a variable-speed conveyor belt over which said tread stock passes, thereafter shrinking the tread stock over decreasing surface speed shrink roll means, and passing the tread stock over a conveyor forming part of a cooling train to set the specifications of the tread stock, and, cutting said tread stock to length in a skiver, the improvement comprising:
   (a) positioning said running-weigh-scale and associated conveyor means adjacent the extruder,
   (b) measuring only the weight per unit length of said tread stock at the running-weigh-scale to generate a measured value,
   (c) comparing said measured value to a target weight to obtain a control signal, and
   (d) adjusting the speed of the conveyor belt of said running-weigh-scale in response to said control signal, whereby the weight per unit length of said tread stock is controlled within ±5 percent limits of weight without regard for any change in dimension of said tread stock, and without varying the operation of said extruder, or, the speed of any other conveyor.

6. The process of claim 5 wherein said tread stock is cut to a predetermined length without affecting said target value.

7. In a process for extruding a continuous strip of tread stock from at least one extruder, passing said tread stock over an adjacent variable speed takeaway conveyor, shrinking said tread stock by passing it over decreasing surface speed shrink roll means, measuring the weight of said tread stock on a running-weigh-scale means, then passing said tread stock over a cooling train to set the specifications of said tread stock, and cutting it to length in a skiver, the improvement comprising:
   (a) positioning said running-weigh-scale after said shrink roll means, and operating said associated conveyor means with a constant belt speed determined by the shrinkage obtained in said ,shrink roll means,
   (b) measuring only the weight per unit length of said tread stock at the running-weigh-scale to generate a measured value,
   (c) comparing said measured value to a target weight to obtain a control signal, and
   (d) adjusting the speed of the takeaway conveyor in response to said control signal, whereby the weight per unit length of said tread stock is controlled within ±5 percent limits of weight without regard for any change in dimension of said tread stock, and without varying the operation of said extruder, or, the speed of any other conveyor.

8. The process of claim 7 wherein said tread stock is cut to predetermined lengths without affecting said target weight.

9. In a tread line comprising at least one extruder means for extruding a tread stock, plural conveyor means for transporting said tread stock, decreasing surface speed shrink rolls to permit shrinkage of said tread stock to a predetermined fixed extent, cooling means cooperating with said conveyor means to provide a cooling train to set the specifications of said tread stock, running-weigh-scale means disposed intermediate said extruder means and said cooling train, and a skiver means for cutting said tread stock to predetermined lengths after it is cooled, the improvement comprising,
   (a) means to generate a measured value derived from said running-weigh-scale means,
   (b) comparator means to compare said measured value with a fixed target weight and generate a control signal,
   (c) a single variable-speed conveyor means proximately disposed relative to said extruder means and intermediate said extruder means and said cooling train, and,
   (d) means for adjusting the speed of said variable speed conveyor only, in response to said control signal, whereby the weight per unit length of said tread stock is controlled within ±5 percent limits of weight without regard for any change in dimension of said tread stock, and without varying the operation of said extruder means, or, the speed of any conveyor other than said variable-speed conveyor.

10. The tread line of claim 9 wherein said running-weigh-scale means and said variable-speed conveyor are each positioned adjacent said extruder ahead of said decreasing surface speed shrink roll means in said tread line.

11. The tread line of claim 9 wherein said running-weigh-scale means and said variable speed conveyor are each positioned distally relative to said extruder, after said decreasing surface speed shrink roll means in said tread line.

* * * * *